United States Patent [19]

Lepley et al.

[11] 3,837,507
[45] Sept. 24, 1974

[54] ADJUSTABLE BOTTOM DISCHARGE FOR SILO

[75] Inventors: James W. Lepley, Smithville; John E. Stoltzfus, Apple Creek, both of Ohio

[73] Assignee: Flying Dutchman, Inc., Smithville, Ohio

[22] Filed: Feb. 20, 1973

[21] Appl. No.: 333,474

[52] U.S. Cl................ 214/17 D, 222/228, 222/310
[51] Int. Cl............................................ B65g 65/48
[58] Field of Search................... 222/310, 556, 558; 214/17 D, 17 DA

[56] References Cited
UNITED STATES PATENTS

| | | | |
|---|---|---|---|
| 2,764,320 | 9/1956 | Broberg et al. | 214/17 DA X |
| 3,043,479 | 7/1962 | Gaukstern | 222/310 X |
| 3,567,078 | 3/1971 | Herr et al. | 214/17 DA X |
| 3,710,960 | 1/1973 | Stauffer et al. | 214/17 DA |

*Primary Examiner*—Robert G. Sheridan
*Attorney, Agent, or Firm*—C. Hercus Just

[57] ABSTRACT

Adjustable discharge means mounted adjacent the bottom of a silo having a discharge opening therein and including a shield member over said discharge opening to prevent clogging thereof, one side of the shield member being open for the admission of material to be discharged therethrough, movement of said material in discharged direction being controlled by a baffle member movable relative to the open side of the shield member and also adapted to close said opening at the completion of a discharge operation. The baffle member is adapted to be adjusted from the exterior of the silo for safety to the operator and minimizing the possibility of ambient air passing into the silo through said discharge opening.

13 Claims, 7 Drawing Figures

PATENTED SEP 24 1974 3,837,507

ADJUSTABLE BOTTOM DISCHARGE FOR SILO

CROSS-REFERENCE TO RELATED APPLICATION

The present invention comprises an improvement over the subject matter of pending patent application Ser. No. 171,153, to Stauffer et al., filed Aug. 12, 1971, now U.S. Pat. No. 3,710,960.

BACKGROUND OF THE INVENTION

Several prior patents which are owned by the asignee of the present invention show certain arrangements of bottom unloading mechanism positioned relative to a discharge opening in the floor of a silo in which a vertical auger extends upwardly into the silo and has a number of material-dislodging chains connected to the auger or the shaft supporting the same and adapted to extend radially outward by centrifugal force when the auger is rotated by power means. These patents comprise No. 3,424,350, to J. H. Herr et al., dated Jan. 28, 1969, and No. 3,576,078, to John H. Herr, dated March 2, 1971. The latter of these two patents comprises an improvement over the former patent. Similarly, the subject matter of said pending application referred to above likewise comprises a still further improvement over the structures of said prior patents.

One of the difficulties experienced in conjunction with the operation of bottom unloading devices for silos comprises jamming or choking the discharge opening in the bottom of the silo under conditions such as when, for example, an arched formation of the stored and compacted silage material collapses and a huge mass of the compacted material falls upon and around the discharge opening in such a manner that it becomes clogged. The structure comprising the subject matter of said aforementioned pending application provides shield means which somewhat meter the movement of material through the discharge opening in the bottom of the silo when such a situation occurs, as well as during normal discharging of material through said discharge opening. Said structure operates in a highly satisfactory manner for the intended purposes of primarily avoiding jamming of the discharge opening. However, it has now become evident that it is highly desirable to control the amount of silage flow or discharge from the bottom of a silo, without the necessity of an operator entering the interior of the silo to effect adjustment of the discharge opening. Current modern livestock feeding methods and processes now require a controlled and changing feed blend, for example, as discharged from a plurality of different silos to a common conveyor belt for distribution to livestock.

Arrangements have been made heretofore by which the discharge rate from silos and other similar storage bins can be regulated but, in the main, such adjustments have required that an operator enter the silo to effect the same. This is not only time consuming, but dangerous to the operator, especially if the silo is loaded with material. Further, effecting such adjustment preferably should consume a minimum of time and also permit regulation, for example, of the discharge rate while the operator is observing the discharge of material upon a conveyor belt, for example, and in the event such discharge rate is not satisfactory, adjustment thereof can be made quickly, from the exterior of the silo, while the operator continues to observe the discharge onto the conveyor belt until the rate appears to be satisfactory. It is the principal purpose of the present invention to enable an opeartor to effect such adjustable discharge not only quickly, but especially from the exterior of the silo. Details of such objectives are as follows.

SUMMARY OF THE INVENTION

It is the principle purpose of the present invention to provide a hood-like shield member which, in its preferred construction, is box-like and has an open side, the member being placed over at least the major portion of the area of the discharge opening in the bottom of a silo, and also providing a movable baffle member which is capable of varying the degree of passage way through said open side of said shield member and also to completely close said open side such as the completion of a discharging operation and thereby prevent the entrance of ambient air into the silo so as to prevent spoilage of the silage or other material stored therein.

It is another object of the invention to provide a baffle member which is U-shaped, the legs of which support the intermediate closure section of the member for movement between fully closed and substantially fully opened position with respect to the open side of said shield member.

It is a further object of the invention to pivotally support the U-shaped baffle member by connecting the terminal ends of the side legs of the member to a horizontally extending shaft, one end of which extends to the exterior of the silo for actuation of the baffle member to various desired adjusted positions thereof between said fully opened and fully closed positions, whereby no internal operation of the discharge mechanism within the silo is necessary.

It is still another object of the invention to provide an actuating member for said shaft in the form of a lever-type member connected at one end to the projecting end of said shaft exteriorly of the wall and especially the foundation wall of the silo, indexing means also being fixed to the exterior of the silo for engagement by adjustment-securing means on said lever type movement.

It is a still further object of the invention to provide wall means defining a downwardly extending chute having the upper end thereof in vertical alignment with the sides or side walls of the hood-like shield member and also being aligned with the discharge opening in the bottom of the silo for direction of discharged material downward toward a discharge conveyor, certain walls of the discharge chute comprising supports for bearings through which said aforementioned shaft extends to support and actuate the movable baffle member with respect to the open side of the shield member.

Details of the foregoing objects and of the invention as well as other objects thereof, are set forth in the following disclosure and also are illustrated in the drawings comprising part thereof.

BRIEF DISCRIPTION OF THE DRAWINGS

DETAILED DESCRIPTION

Figure 1:
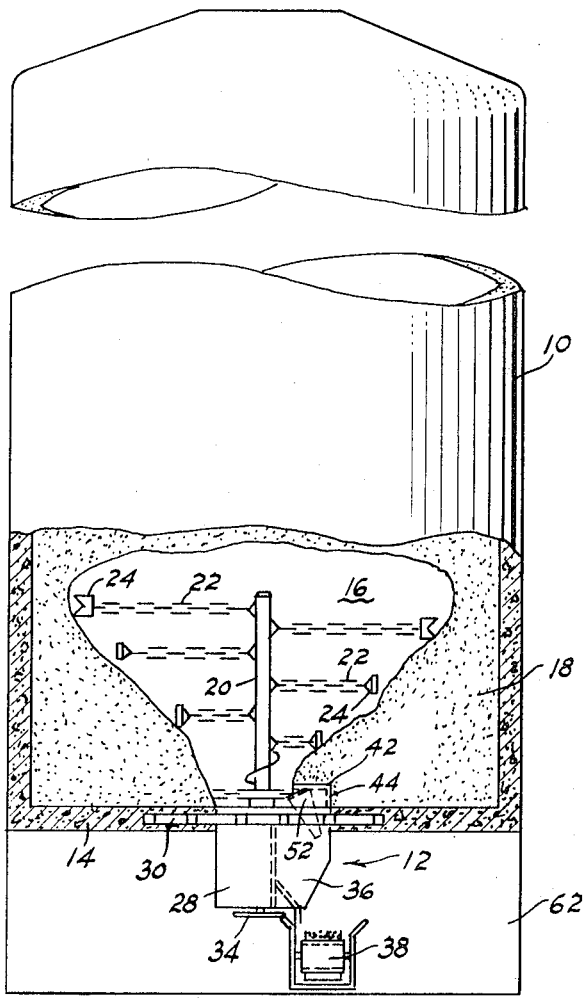
FIG. 1 is a vertical elevation of an exemplary silo illustrated in foreshortened manner and also broken away in the lower portion thereof to illustrate details of discharge means associated with the bottom of said silo.

A typical silo 10 to which the present invention pertains is illustrated in FIG. 1. The same is interupted intermediately of the height in order to foreshorten the view. Similarly, the lower portion of the side wall is broken away to expose the interior of the silo and particularly show the relative positions of certain elements of the discharge mechanism 12 which is associated with the bottom 14 of the silo. Similarly, somewhat typical, exemplary cavity 16 is formed in the mass of silage 18 by operation of the exemplary auger 20 and the flexible chains 22 of different, graduated lengths which are provided with digging elements 24 on the outer ends therof. The chains 22 are interconnected either to the shaft which supports the auger 20 or directly to said auger. When the shaft and auger are rotated, centrifugal force gradually extends the shaft 22 substantially horizontally and causes the digging elements 24 to dislodge the silage material for movement by gravity to the discharge opening 26 in the floor or bottom 14 shown in FIG. 7.

The bottom 14 of the silo, adjacent the discharge opening 14, is provided with a structural frame 28, the upper end of which is suitably supported by appropriate reinforcing means 30, shown in FIG. 1, which may be incorporated in the bottom 14 such as by being formed from poured concrete, whereby the reinforcing means 30 become incorporated therein. The principal purpose of the structural frame 28 is to support power means, such as electric motor 32, shown in FIG. 4, which is connected, for example, by suitable sheaves 34, see FIGS. 1 and 2, the sheave illustrated therein, being connected to the lower end of the shaft which extends upward through the structural frame 28 and is supported by rotary thrust bearings therein, not shown, for attachment of the tubular central member of the auger 20 thereto. This structure is similar to that illustrated in greater detail in said aforementioned patents and especially No. 3,567,078, in FIGS. 1 and 6.

Figure 2:
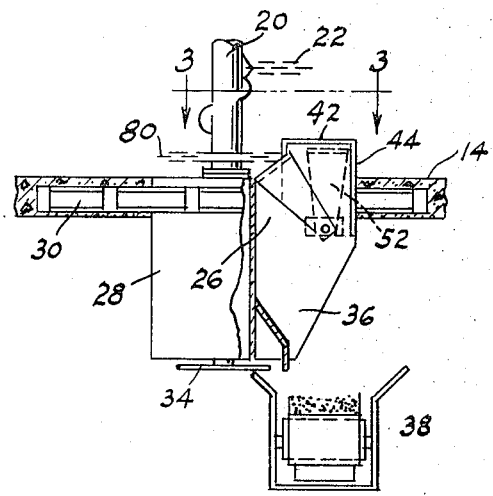
FIG. 2 is a vertically sectioned view showing, fragmentarily, details of the discharge mechanism shown in the lower portion of FIG. 1, said view illustrating the baffle member of the discharge mechanism in closed position in full lines and, in phantom, said baffle member being shown in fully opened position.
Figure 7:
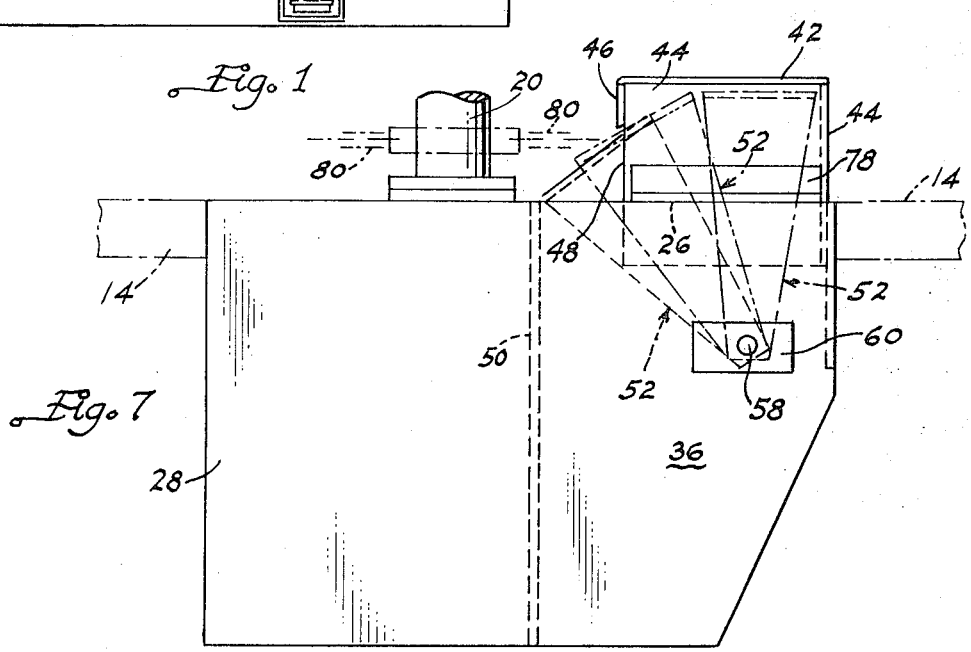
FIG. 7 is a fragmentary side elevation comprising an enlarged illustration of the upper portion of the mechanism shown in FIG. 2 above the discharge conveyor shown therein for purposes of illustrating in phantom a plurality of different adjusted positions of the baffle member relative to the sheild member.
Figure 3:
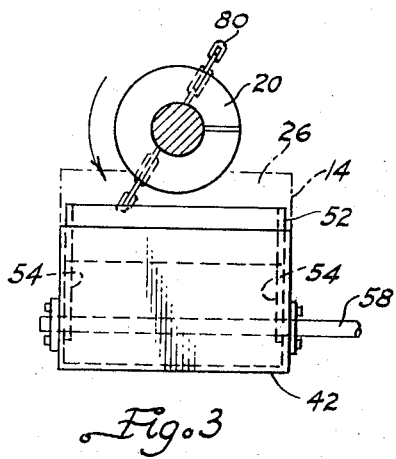
FIG. 3 is a fragmentary top plan view of part of the discharge mechanism as seen on the line 3—3 of FIG. 2 but as viewed at a right angle to said line.
Figure 4:
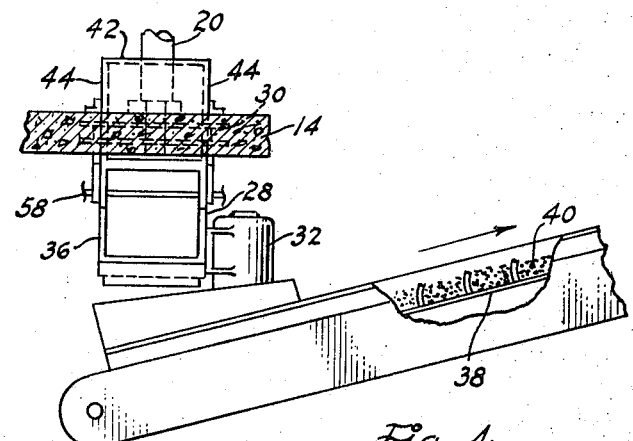
FIG. 4 is a fragmentary side elevation of the mechanism shown in FIG. 2.

As viewed in FIGS. 1, 2, and 7, the right hand portion of the structural frame 28 comprises a discharge chute 36 which extends downwardly from discharge opening 26, in vertical alignment therewith, for purposes of directing discharge material onto a conveyor belt 38 which preferably extends upwardly and away from the discharge end of the chute 38 to convey the loosened and discharged material 40, as shown in FIG. 4, in the direction of the arrow shown in such figure for direct conveyance to feed troughs, or mixing equipment of various kinds, whereby the discharge material is mixed with material discharged from other storage deposits or silos as referred to hereinabove in accordance with modern practices of feeding livestock.

The structural frame 28 as well as the discharge chute 30 are formed from a plurality of connected metal plates. At the upper end of the discharge chute 36, and vertically aligned therewith above the discharge opening 26 in bottom 14 is a hood-like shield member 42. The top of the shield member 42, as best shown in FIGS. 1, 2, 4, 5, and 7, preferably is flat. Extending downward from three of the edges thereof are sheet metal plates comprising side walls 44, the lower ends of which preferably overlap interiorly with certain of the plates forming the sides of discharge chute 36. This is best shown in FIG. 7.

The fourth edge of the top panel of shield member 42 has a narrow strip 46, best shown in FIG. 7, extending downward therefrom. The lower edge of the strip 46 defines the upper boundary of an otherwise open side 48 of shield member 42. Said open side 48 communicates with the discharge opening 26 in the bottom 14 of the silo. It also will be seen that the transverse wall 50, see FIG. 7, which defines one side of discharge chute 36, is laterally spaced away a short distance from the plane of but parallel to the open side 48 of shield member 42. Hence, in actuality, the opening through which silage will pass from the interior of the silo 10 to the discharge chute 36 is the space between the upper edge of transverse wall 50 of chute 36 and the lower edge of narrow strip 48 connected across the open side 48 of shield member 42.

For purposes of regulating the discharge of loosened material which falls by gravity from the interior of the silo 10 incident to the rotation of auger 20 and the chains 22, the present invention includes a baffle member 52 which is U-shaped and includes a pair of parallel side legs 54 between which a closure section 56 extends transversely and is integral therewith. The length of the closure section 56 is equal to the transverse dimension of the discharge opening 26 in one direction which extends transversely between the opposite sides of shield member 42, and the width of the section 56 in the direction parallel to the planes of the side legs 54 is at least equal to the distance between the upper edge of transverse wall 50 of discharge chute 36 and the lower edge of the narrow strip 46 which extends partially downward across the open side 48 of shield member 42.

The terminal ends of the legs 54 of the baffle member 52 are connected by any suitable means fixedly to longitudinally spaced location on transversely extending shaft 58 shown in FIGS. 3 and 5–7. Such shaft preferably is supported by suitable bearings formed in bearing plates 60, see FIG. 7, respectively connected to opposing side plates comprising portions of the walls of discharge chute 36. Hence, from FIG. 7 in particular, it'll be seen that the axis of rotation of the U-shaped baffle member 52 is below the level of the discharge opening 26 in bottom 14 of silo 10 and offset toward the right from the center of the chute 36 which is substantially in alignment with the discharge opening 26. In view of such arrangement, itll be seen that the shaft 58, when rotated respectively in opposite directions, will move the baffle member 52 and especially the closure section 56 thereof respectively between fully closed position, which is shown in full lines in FIG. 7, and fully opened position which is shown farthest to the right, in phantom, in FIG. 7, in which latter position the baffle member is completely retracted into the interior of shield member 42. FIG. 7 also illustrates an exemplary intermediate, adjusted position of the baffle member 52 which is merely exemplary of any of a number of different adjusted positions in which the baffle member may be located to effect a controlled rate of discharge of material through the opening which will extend, for example, between the upper edge of transverse wall 50 and the nearest edge of the closure section 56 of baffle member 52.

If the baffle member 52 is retracted into the shield member 42 so that the outermost edge of closure section 56 at least does not project beyond the lower edge of narrow strip 46 of shield member 42, such arrangement will comprise full opening of the discharge mechanism which is the space between the upper edge of transverse wall 50 and the lower edge of narrow strip 46. Further, when the baffle member 52 is disposed in the full line position illustrated in FIG. 7, it is in the fully closed position. In this position, it'll be seen that one edge of the closure section 56 of baffle member 52 is substantially in abutment with the upper edge of transverse wall 50 of chute 36 and another portion of the outer surface of closure section 56 is substantially in abutment with the lower edge of narrow strip 46 and the adjacent portions of the side legs 54 thereof comprise side closing means for the discharge space between the upper edge of transverse wall 50 and the lower edge of narrow strip 46. Accordingly, when the baffle member is in said closed position, substantially no ingress of ambient air into the interior of the silo is possible, thereby minimizing and preferably preventing the occurance of spoilage due to contact of air with the contents 18 of the silo 10 between discharging operations.

For purposes of regulating as well as maintaining a desired adjusted position of the baffle member 52 at a desired location intermediately between its fully closed and fully opened position, one end of the shaft 58 is sufficiently long to extend through the outer wall of the foundation section 62 of the silo 10. If desired, a flexible joint, such as an exemplary universal joint, not shown, may be inserted between the opposite ends of the extended portion of said shaft. For purposes of the present invention, the important feature is that the terminal end of the projecting portion of shaft 58 extends beyond the exterior surface of a side wall of silo 10 or the foundation 62, whereby an operating member, such as exemplary crank lever, 64 may be fixed to said shaft. The outer end 66 comprises a manually engageable means by which the shaft 58 may be rotated in opposite directions in order to adjust the desired position of closure section 56 of baffle member 52 relative to the discharge opening 26 or the discharge space which will be defined between the upper edge of transverse wall 50 and the adjacent edge of said closure section 56 of baffle member 52.

Figure 6:
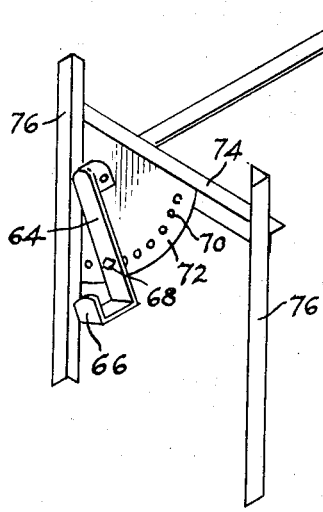
FIG. 6 is a fragmentary top plan view of the crank-type actuating mechanism and indexing member illustrated in the left-hand portion of FIG. 5.
Figure 6:
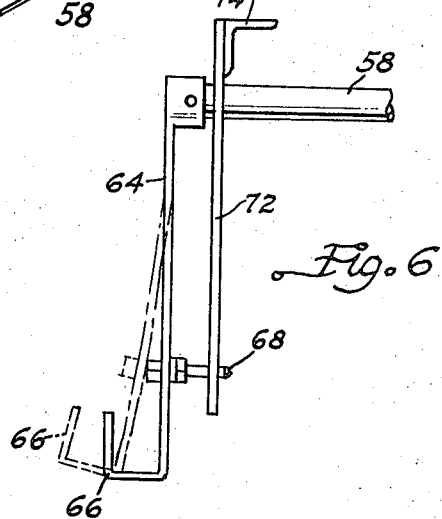

In the preferred construction, the crank arm 64 may, for example, be formed from material having limited flexibility, whereby the outer end 66 thereof may be moved out of the normal plane thereof, such as to the dotted line position shown in FIG. 6, for purposes of permitting positioning of a set pin 68 relative to any one of the receiving holes 70 which are arranged in arcuate pattern in indexing plate 72. The indexing plate 72 is supported in any suitable manner such as by a cross-bar 74 which has the ends therof connected to vertical supporting members 76, for example, which may be secured to the exterior surface of the silo 10 or the foundation wall 62, whereby it'll be seen that exterior adjustment of the size of the discharge opening, and consequently of the rate of discharge of material through the discharge opening 26, may be effected.

Figure 5:
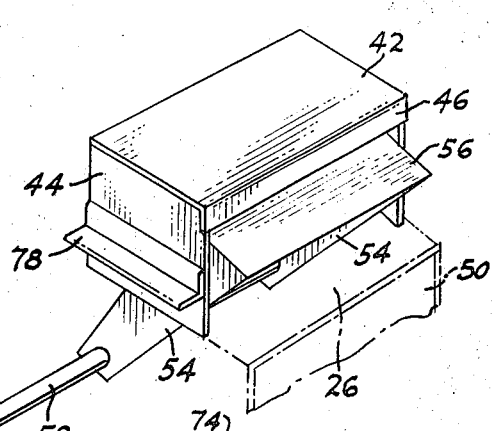
FIG. 5 is a perspective, partly foreshortened view illustrating per se the hood-like shield member and the baffle member pivotally arranged therewith for actuation by the supporting shaft therefor and the crank-type lever and indexing member therefor which is mounted exteriorly of the silo.

The shield member 42 may be fixedly supported relative to the discharge opening 26 and the discharge chute 36 by any suitable means. Referring to FIG. 5, exemplary supporting means are illustrated in the form of structural angles 78 which respectively are welded or otherwise affixed to opposite sides 44 of the shield member 42. Said angles 78 provide horizontally extending flanges which may rest upon the upper surface of the bottom 14 of the silo and be connected thereto by any appropriate means, whereby the same will not interfere with the operation of the chains which project from the auger 20 or the shaft supporting the same. In addition, particularly to facilitate the movement of dislodged material from the upper surface of the bottom 14 into and through the discharge opening 26 and particularly the adjusted space leading thereto which is controlled by the position of the baffle member 52, a plurality of relatively short dislodging chains 80 are connected to the lower portion of the auger 20 or the shaft supporting the same at a vertical level either substantially even with or slightly below the lower edge of the narrow strip 46. The length of said chains however is such that the outer ends thereof do not engage any part of the shield member 42 or the baffle member 52 during the operation thereof.

From the foregoing, itll be seen that the present invention provides mechanism for controlling, regulating, and adjustably varying the discharge rate of pulverulent or comminuted material from a compacted mass thereof within a silo to a discharge conveyor or other comparable means, whereby the system is especially adaptable to modern feeding techniques and programs for livestock wherein mixtures of substantially predetermined, measures quantities of different types of material are either fed simultaneously or are mixed before being fed to feed lots, troughs, or other feeding equipment for livestock. To facilitate such adjustment of delivery rate, the mechanism comprising the invention is adapted to be operated from the exterior of the silo or a foundation for the same, whereby not only is safety for the operator provided but, of equal importance, in addition to the speed with which an adjustment may be made, the mechanism is adapted to be operated to close the discharge opening and thereby prevent the ingress of air to the interior of the silo at the completion of a discharge operation. Maintance of the adjusted position of the discharge means readily is maintained by indexing mechanism mounted exteriorly of the silo or its foundation. Further, the mechanism is relatively simple to install either in a newly constructed silo or, with minimum modifications, the mechanism may be installed in existing silos.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. For use with and attachment to a silo for storing pulverulent material having a bottom provided with a discharge opening to pass material by gravity, and an auger extending upward from said bottom adjacent said opening and dislodging chains adapted to extend outward by centrifugal force from the axis of said auger when said auger is rotated by power means; discharge improvement means comprising discharge control means adapted to be mounted adjacent said auger and discharge opening and including a hood-like shield member positionable at least partially over the major portion of said opening and at least the side thereof nearest said auger being open to provide a discharge space communicating with said discharge opening, a substantially horizontal shaft supported relative to said shield member, and a flow restricting baffle member supported by said shaft means for movement relative to said open side of said shield member and adapted to vary the size of the opening into said shield member and thereby regulate the flow of material through said discharge space and opening.

2. The improvement means according to claim 1 in which said baffle is substantially U-shaped and the side members thereof comprising legs extending downwardly and connected to said substantially horizontal shaft, and means operable to rotate said shaft through a limited arc to move the intermediate portion of said baffle relative to said open side of said hood-like enclosure to effect adjustable discharge of material therethrough.

3. The improvement means according to claim 2 in which said hood-like enclosure is boxlike and said discharge control means further includes wall means defining a discharge chute adapted to extend downward from the edges of said discharge opening in said bottom of a silo, the walls depending from the closed sides of said boxlike enclosure being substantially in vertical alignment with certain walls of said chute and one of said walls being spaced horizontally a limited distance beyond said open side of said boxlike enclosure, and said intermediate portion of said baffle extending between the upper edge of said one wall of said chute and the upper edge of said open side of said boxlike enclosure when in closing positon for said discharge opening and being movable arcuately into the upper portion of said enclosure to open said opening for discharge.

4. The improvement means according to claim 2 in which one end of said shaft extends laterally from said baffle a distance adequate to project through a wall of a silo, and said means operable to rotate said shaft comprising a crank arm connected to the projecting outer end of said shaft, whereby adjusting movement of said baffle can occur from the exterior of the silo and thus facilitate such adjustment with minimum passiblilty of introduction of ambient air into the silo interior.

5. A silo for pulverulent material and comminuted agricultural products having a bottom provided with a discharge opening therein and an auger extending upwardly into said silo from said bottom adjacent said opening, in combination with bottom unloading mechanism comprising a hood-like shield member open at one side and extending over at least the major portion of the area of siad discharge opening to prevent choking said discharge opening during discharge of material from said silo, and a baffle member movably supported relative to said shield member adjacent said open side thereof and movable between opposite extreme positons in which said member respectively substantially fully closes said open side thereof and in which said baffle member is retracted substantially fully into said shield member, whereby said open side is substantially fully open, as well as positions therebetween to regulate the flow of material through said open side of said shield member and said opening in the bottom of said silo.

6. The silo discharge mechanism according to claim 5 in which said baffle member is substantially U-shaped to provide legs and including a shaft pivotally supported adjacent the lower portion of said shield member, means connecting said legs to said shaft to effect movement of the intermediate portion of said U-shaped baffle member relative to said shield member, and one end of said shaft extending to the exterior of the silo for remote actuation of said discharge mechanism.

7. The silo discharge mechanism according to claim 6 further including a manually operable lever type actuating member fixed at one end to said one end of said shaft, and indexing means mounted exteriorly of said silo adjacent said actuating member and engageable by said member to maintain a desired position of adjustment of said baffle member relative to said shield member.

8. The silo discharge mechanism according to claim 5 in which said baffle member is substantially U-shaped to provide a pair of supporting legs and an intermediate closure section, said mechanism further including means pivotally supporting said legs relative to said shield member for movement of said closure section arcuately about an axis parallel to the plane of said open side and an alternate open position in which said closure section is retracted into said shield member.

9. The silo discharge mechanism according to claim 8 further including a shaft rotatably mounted below the top of said shield member and the upper edge of said open side of said shield member being defined by the lower edge of a narrow strip extending downwardly from the top of said shield member, said closure section of said baffle substantially having wiping engagement with the lower edge of said narrow strip when moved relative thereto, and means connecting said legs of said baffle member to said shaft for support thereby.

10. The silo discharge mechanism according to claim 9 further including short flexible members interconnected to said auger horizontally opposite said open side of said shield member and adapted to be extended laterally from the axis of said auger when it is rotating operatively to dislodge material adjacent said open side of said shield member and move the same into said shield member, said flexible members having a length adequate to extend a limited distance toward said shield member without engaging said baffle member or the sides of said shield member.

11. The silo discharge mechanism according to claim 8 further including wall means connected together to form a discharge chute extending downward from the bottom of the silo in alignment with said discharge opening therein and the sides of said shield member, bearings in opposite walls of said chute below said shield member, a shaft extending between said bearings, and means connecting said legs to said shaft to provide said pivotal support therefor, said intermediate closure section of said baffle member having one edge substantially in contact with the upper end of one wall of said chute when in closed position.

12. The silo discharge mechanism according to claim 11 in which the edge of said closure section of said baffle member which is opposite said one edge is substantially in contact with the upper portion of said shield member which defines said open side thereof when said closure section of said baffle member is in closing position relative to said open side of said shield member.

13. The silo discharge mechanism according to claim 11 in which one end of said shaft projects to the exterior of the silo, and actuating means connected to said projecting end of said shaft to provide means to adjust the discharge rate through said discharge opening in the bottom of said silo and closing of the same from a remote exterior position relative to the interior of said silo.

* * * * *